United States Patent
Morrison et al.

(10) Patent No.: US 7,610,058 B2
(45) Date of Patent: Oct. 27, 2009

(54) REVERSE LOOP PROTOCOL

(75) Inventors: John Allan Morrison, New Providence, NJ (US); Alexandro Salvarani, Edison, NJ (US); Philip Alfred Whiting, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 549 days.

(21) Appl. No.: 11/080,961

(22) Filed: Mar. 15, 2005

(65) Prior Publication Data

US 2006/0234749 A1  Oct. 19, 2006

(51) Int. Cl.
 *H04B 7/00* (2006.01)
 *H04Q 7/20* (2006.01)
(52) U.S. Cl. ............... 455/522; 455/69; 455/452.1; 455/126
(58) Field of Classification Search ............ 455/522, 455/69, 452.1, 452.2, 450, 115.3, 127.2, 455/67.13, 67.11, 3.01, 126, 542.1, 13.4, 455/115.1, 67.16, 127.1; 370/335, 311, 318
See application file for complete search history.

(56) References Cited

U.S. PATENT DOCUMENTS

| | | | | |
|---|---|---|---|---|
| 6,449,463 | B1 * | 9/2002 | Schiff | 455/69 |
| 2002/0198014 | A1 * | 12/2002 | Miyamoto et al. | 455/522 |
| 2003/0064743 | A1 * | 4/2003 | Chen | 455/522 |
| 2003/0072294 | A1 * | 4/2003 | Wei et al. | 370/345 |
| 2003/0189911 | A1 * | 10/2003 | Saifuddin et al. | 370/335 |
| 2004/0047305 | A1 * | 3/2004 | Ulupinar | 370/320 |
| 2005/0124369 | A1 * | 6/2005 | Attar et al. | 455/522 |
| 2005/0124371 | A1 * | 6/2005 | Harris et al. | 455/522 |
| 2007/0066320 | A1 * | 3/2007 | Padovani et al. | 455/450 |

OTHER PUBLICATIONS

Morrison, JA and Whiting, PA. Asymptotic Analysis for a CDMA Reverse Link with Imperfect Power Control and Multiple Services, CISS 2004 Conf. Mar. 17-19, 2004, Princeton, NJ.

* cited by examiner

*Primary Examiner*—John J Lee
(74) *Attorney, Agent, or Firm*—Harness, Dickey & Pierce, P.L.C.

(57) ABSTRACT

It is possible to operate a wireless system, such as a CDMA system, in a more efficient manner by employing a statistical approach for setting power targets for reverse loop transmission. Unlike present methods for setting such targets a figure-of-merit quantity such as the frame error rate need not be measured to set the reverse loop transmission power for a wireless unit. Instead the target is set on a statistical basis established by sampling. Real time measurement of a quantity-of-merit is not required. A statistical approach produces among other things a decreased sensitivity to rapid changes in transmission conditions.

20 Claims, 1 Drawing Sheet

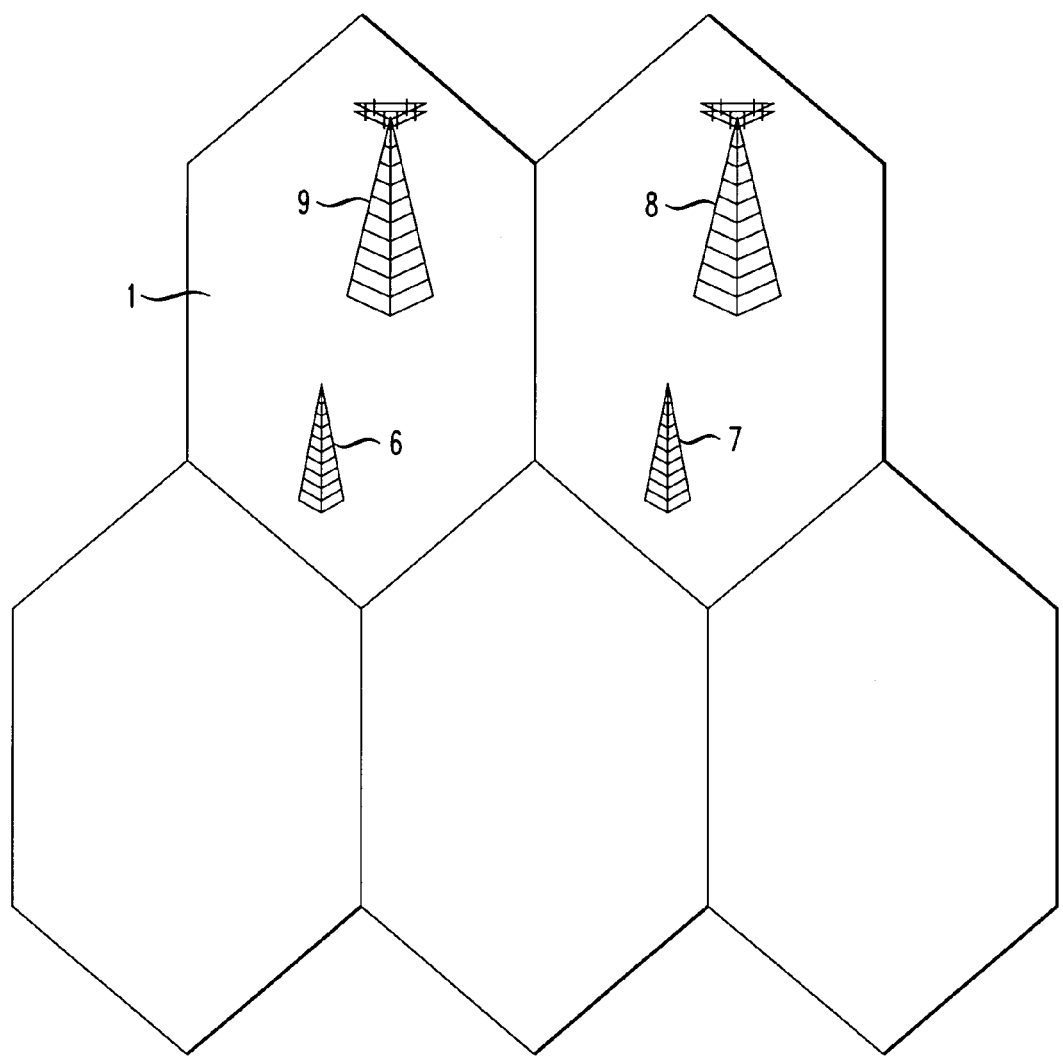

REVERSE LOOP PROTOCOL

TECHNICAL FIELD

This invention relates to wireless communication and in particular to the reverse loop in wireless such as CDMA communication.

BACKGROUND OF THE INVENTION

Wireless communication networks are composed of cells with at least one base station in each cell. Information such as voice communication or data is routed to a base station in the vicinity of a wireless transceiver, such as a mobile transceiver, and then transmitted by the base station to the transceiver in what is denominated the forward link. In turn, information is transmitted from the transceiver to a base station (in what is denominated the reverse link) and then relayed through the network to the intended recipient.

As compared to the forward link, the power available at a transceiver, such as a mobile transceiver, for transmission in the reverse link is generally much smaller—typically ten or more times less than the forward link. Therefore, in a reverse link there is a smaller power range available to produce an acceptable signal-to-noise ratio relative to the extant interference. Such interference emanates not only from the environment (e.g. from microwave ovens, automobiles, and other man made sources of interference), but also from the transmissions of other transceivers in adjacent cells and in the same cell. (Transmissions initiated in other cells are generally a weaker source of interference but are often not negligible.)

The level of total interference that is manageable for the lower power levels of the reverse link depends on the type of transmission, e.g. data or voice, and upon the promised quality of service. Voice transmission often is acceptable despite a significant error rate while data transmissions at such significant error rates would be unacceptable. Similarly, different customers require different classes of service. A bank electronically transferring money might well require transmissions with a relatively low received bit error rate compared to a typical communication subscriber.

In a CDMA wireless system conforming to present-day standards (IS-95 and subsequent) the bit error rate for a reverse link transmission is controlled by a protocol employing an inner and outer control loop. This dual loop controls the power of the reverse link signal by sending a control signal in the forward link telling the transceiver the intensity level at which it should transmit. The higher this indicated reverse loop transmission level, the lower the corresponding bit error rate such transmission incurs. However, the higher the transmission power the more rapidly the battery of the transceiver loses charge and the greater the interference effect of such higher power transmission on other reverse loop transmissions. Thus the goal of an inner/outer loop expedient is to maintain an acceptable communication quality for all subscribers in all service classes by appropriately controlling reverse loop transmission power for each such subscriber.

The outer loop sets the power target for the reverse loop transmission. To set this target the frame error rate for each subscriber's reverse loop transmission is monitored. That is, each frame (presently 192 bits every 20 ms) undergoes a parity check, and parity failure is equated with frame failure. An acceptable frame error rate level, e.g. 1 percent, is set for all subscribers or for classes of subscribers. If the measured frame error rate exceeds this set level for a subscriber's reverse loop transmission, the power target is raised. If an unacceptable frame error level is not reached, the target is lowered. However, the increment of increase is typically 100 times the increment of decrease for a targeted frame loss of about 1 percent. For more demanding frame error targets (0.1 or 0.01 percent) the difference between the increment of increase and increment of decrease is even greater. Upon an incremental change in power target, the inner loop then sends a control signal at intervals typically of between 1.25 ms and 10 ms (100 to 800 Hz) ordering, as required by the new target, an incremental increase or decrease in power of approximately 1 dB. The inner loop continues rapidly (relative to the speed of the outer loop interval) adjusting the control signal by, for example, 1 dB in response to the relatively slow outer loop measurement and corresponding target adjustment.

Such CDMA systems have performed reliably but have some limitations that are not totally desirable. Because the up increment of the outer loop is much larger than the down increment even for modest error targets, the transmission power employed is on average higher than needed for acceptable performance. A safety factor is ensured, but higher transmission powers lead concomitantly to increased interference at other transceivers. Additionally, the two loop approach does not adequately react to rapidly changing transmission events. For example, the relatively slow outer loop does not react to a rapid data transmission burst occurring in time periods of a few frames or less despite the potential for producing unacceptable error levels. Similarly the outer loop is unable to change targets at a rate sufficient to maintain acceptable error levels for an extended but rapidly changing signal power before the relatively slow outer loop initiates compensation. Longer term transmission also encounters difficulties. A mobile transceiver localized for a period of time such as at a red traffic light in a location with a line of sight transmission to the base station results in a strong signal being received. Thus the outer and inner loop work together to substantially lower the associated transmission power. If the subsequent movement of the transceiver (such as driving into an area with surrounding buildings) results in a sudden reduction in received signal power, the relative slow response of the outer loop yields an unacceptable bit error rate for an extended time while the extremely low transmission power is raised substantially. Additionally, as the vehicle moves, the likelihood of rapid fluctuations in received power increases with the previously discussed associated difficulties.

Therefore, the tendency to set transmission power at a level higher than essential for acceptable performance and rapid changes in transmission power in the reverse loop limits the efficiency of communication service. It would be quite advantageous to have an approach that provides better service despite rapid power changes without inducing an unacceptable increase in the average transmission power in the network. That is, a system that does not rely on an ability to track and adapt to varying signal-to-noise conditions to produce an acceptable frame error rate is an elusive goal.

SUMMARY OF THE INVENTION

By eliminating, in a wireless system such as a CDMA system, expedients such as the outer control loop and setting power targets based at least in part on statistics, improved frame error rates are attained at nominal power levels. For example, difficulties associated with safety factors for power transmission and with rapid transients, such as data bursts or red light scenarios, are substantially avoided by setting targets based on a statistical approach. Thus for demanding transmission circumstances such as rapid rate burst data transmissions (compared to email and facsimile transmissions), improved signal-to-noise levels are achieved at a given level of interference.

More efficient network operation is accomplished by setting at least one power target not in conformance with a real-time frame error measurement, but instead based on a representative sampling of one or more quantities and a power target based on statistics of these quantities such as represented by the equation (5.27) in the appendix. Targets are advantageously set and are not modified due to fluctuations in frame error rates. Instead targets are set based on an expected level of interference in the operating environment of the cell determined from measurement of statistical quantities that are not figure-of-merit quantities. In the context of this invention a figure-of-merit quantity is a quantity that alone, without any other variable, is mappable with an error less than 40 percent to bit-error-rate. In contrast, a statistical quantity is a random variable, i.e. a variable measured experimentally that has an assignable probability of occurring in any interval. Such statistical quantities include for example, 1) number of transceivers in a cell (arrivals or departures), 2) deviation between target power and actual received power, 3) noise emanating from outside the cell as characterized by its mean and variance, and 4) activity (fraction of time transmitting). Changes in such statistical factors occur generally after an extended time period and are not dependent on a change in measured frame error rate, or necessarily a periodic real-time measurement of any figure-of-merit. In essence, an ensemble of power targets are chosen that yield desired goals for the predicted behavior of the cell. Since setting of targets need not await performance measurement the invention is much less vulnerable to transient events.

In one embodiment, statistical samplings are made of suitable statistical quantities and equation (5.27) of the appendix is used to determine power targets. Use of the invention produces an improved network efficiency (lower average power for the same level of service), is much less susceptible to transient events, does not require continuous monitoring of performance, and has broad application to a wide range of networks. It is also possible to influence the performance of the system by appropriately altering the transmission statistics to a desirable regime by, for example, controlling the fraction of time a transceiver is active. When a network is not congested, a regime that produces desirable results for all users is feasible while during congested periods a regime is chosen that remains within a feasible operating range with a reasonable probability.

BRIEF DESCRIPTION OF THE DRAWINGS

The FIGURE is a representation of cells in a communication system.

DETAILED DESCRIPTION

Surprisingly it has been found that determinations of the probability of specific circumstances existing in a communication network lead to the efficient allocation of suitable reverse loop power targets for a plurality of transceivers operating in a cell such as the cell, 1, with base station 9 in the FIGURE. Since the power targets are based not on measured error rates but on statistical considerations, the method is most reliable when the average number of transceivers, 6, in a cell over an operating period is at least 5 preferably 10. Although operation is acceptable for fewer transceivers, the operation of such a cell is not as efficient because the power targets are chosen based on statistical determinations that rely on a sufficiently large sampling to produce probability estimates. Nevertheless, surprisingly a relatively small number of users provide adequate statistics for reliable results.

The interference with each reverse loop communication emanates from other transceivers within the cell, transceivers, 7, and base stations, 8, from outside the cell, and from environmental noise such as thermal noise, mobiles from a different wireless technology transmitting in neighbor carriers, and other man made sources of interference. Thus in an advantageous embodiment the effects of such sources of noise should be considered. Additionally, most transceivers do not broadcast continuously. The active periods and idle periods are often of equal magnitude. It is therefore advantageous to determine a suitable power target not only for the active state but also for the idle state. Furthermore, in many communication networks, an operator of such a network allows subscribers to choose the quality of service that they require and thus the cost of the associated service. Accordingly, it is also desirable to set statistical power targets that account for a multiplicity of performance classes, i.e. classes of users that are entitled to a specific quality level for their communications. Finally, although power targets are set both in the active and idle state of a transceiver, the actual power transmitted by a transceiver is generally not precisely that of the target. Therefore, the error associated with the actual transmitted power compared to the power target to be achieved should generally be considered to improve reliability of the reverse loop control system.

Although a variety of approaches exist to provide a statistically based power target, an approach that holds particular promise involves an asymptotic analysis as shown in the appendix to this description. This asymptotic approach includes consideration of the number of users within a cell, the activity of such users, the error in transmission power relative to power targets, classes of service, and interference from external sources, (both environmental and from transmissions in other cells). Thus as shown in equation (5.27) of the appendix, the active state power target is dependent on $\alpha_j$ and thus the signal-to-noise threshold $\alpha_j/W$ with W being the spread bandwidth. (The parameter $\alpha_j$ is also defined by the equation $E_b/I_0 = \alpha_j/R_i$ where $R_i$ is the unencoded data bit rate of a class i transceiver, $E_b$ is the bit energy, and $I_0$ is the interference density i.e. the interference power divided by the signal spread bandwidth.) Thus in the advantageous model of the appendix, the quantity $\alpha_j$ is determined by system operating constraints, e.g. the spread bandwidth, and the largest acceptable signal-to-noise ratio. Similarly, $\kappa_j$ is also employed for determining the power target. The physical analog to $\kappa_j$ is related to the standard deviation of the error between 1) the actual received power in attempting to meet the power target and 2) such target. Again, this quantity is determinable using a controlled sample by computing the average-of-the-square deviation in dB from the desired target. It is possible to measure such deviation in real time using power correlates located at the base station. (The measurement of this deviation is extremely fast and does not unacceptably impede the process.) The quantity $v_j$ as shown in equation (4.6) of the appendix is determined from the probability of outage in class j ($L_j$) and from a normal distribution table that will set $v_j$ for a given $L_j$. Thus once acceptable outage quantities, $L_j$ are set by the system operator depending on the class of service and the acceptable outage rate for such class, the $v_j$'s are simply determined.

The quantity $\delta$ as shown in equation (5.23) is based on the quantities previously discussed as well as $\bar{P}_j$ which is the maximum received reverse loop transmission power acceptable for a transceiver in class j and on analogous quantities pertaining to the idle states. Such maximums are typically set by the communications service provider based on a variety of considerations such as channel rate, quality of service, cell coverage, and reverse RF overload conditions. Additionally, the quantities $\omega_j$ and $\zeta_j$ are also variables that determine the power target. These quantities are computed in accordance with equations (5.16), (5.17), and (5.19) based on the previously discussed parameters, on the number of users $K_j$ in class j, and on $w_j$, the percentage of time a receiver in class j is active. Again, a controlled sampling is employable to determine such activity fraction (in a statistical analysis of the data taken on such sampling, the mean or a quantity within a variance of the mean is employed for $w_j$.) Alternatively it is possible to monitor such activity coefficient in real time using direct measurements at the base station for each class j. The quantities $\tau$ and X are given by equations (5.20) and (5.21). The local receiver noise power is assumed to have a constant value of $\eta W$.

The considerations of interference from external cells are introduced by the quantity $\psi$ which in turn as shown in equation (5.18) is determinable from the mean and variance measured from a statistical sample of external interference. The number of external interferers is denoted by $K_0$. Thus as discussed, the power targets $P_j^*$ are determinable not by measuring a quality-of-service related parameter, but instead by making statistical determinations of fundamental quantities such as, received power error relative to target, and activity time fraction, and by using set system constraints such as maximum acceptable transmission powers, and maximum allowable error rate. As discussed, the statistical quantities are determined either in real time or a$^i$ priori by statistical sampling techniques and the latter are set by the system operator. (Generally the value used for a statistical quantity is the mean or a value within a variance of the mean.)

Power targets, $p_j^*$, should advantageously also be set for a transceiver in the idle state. A suitable equation governing such quantity is also shown in (5.27) of the appendix. Each quantity employed to determine $p_j^*$ is a counterpart to that used for determining $P_j^*$ and thus further discussion is not required. The parameters employed to determine $p_j^*$ are determinable as described for their counterparts in determining $P_j^*$.

Although the statistical method described yields efficient operation of a wireless system, under most circumstances, there are situations where the wireless system, due to anomalous conditions, operates in a regime for which the statistics employed are not applicable. The system is not in an anomalous regime if the inequality (5.26) holds. If the system begins operation in a regime outside of the boundary, for time periods generally greater than that leading to unacceptably degraded service then a corrective measure such as limiting the number of users in a class and/or limiting activity periods is typically employed to bring the system back into an acceptable operating regime. It is possible to monitor the number of users in a class within a cell by tracking arrivals and departures.

In the method of the invention, an outer loop is not required. The power targets typically set by an outer loop are instead set by previously determined parameters established by statistical methods, using, for example, real time measurements such as power deviation that are relatively rapid (compared to typical measurements of quality of service in an outer loop) and statistical quantities derived from such measurements. It is possible to set suitable targets without reference to measurement of a figure-of-merit. Thus a burst of data, and/or fluctuations in transmission power do not unacceptably degrade the quality of service provided operation is within a non-anomalous regime. In particular, real time quality of service measurements need not be made and thus the relatively large time constant introduced by such measurements are not a consideration. Similarly since large incremental power changes associated with an outer loop are not employed, the difficulties attendant such changes are not a consideration. Problems such as the red light scenario are not present for a statistics-based system. Specifically as a transceiver moves away from a red light, although the reverse loop power received at the base station from such transceiver might rapidly vary, the statistics already embedded in the system accommodate such variations. Thus no large incremental changes in target power or relatively slow measurements of service quality are involved. The system does not react to such changes in the reverse link; instead the system is set up to accommodate them. Additionally, if desired, the speed of the car is monitorable and useful as a further statistical quantity used to determine the power target.

Although a statistically-based system is described, it is possible to employ such system in conjunction with some quality of service measurements such as those taken to accomplish reverse link power control, or reverse link overload control.

The invention claimed is:

1. A method for operating a wireless communication system, said system including forward transmission loops from a transmission base station of a cell to a plurality of wireless transceivers and at least five reverse communication loops, said reverse loops each between at least one of said wireless transceivers and said base station, wherein said method comprises, assigning a power target for a reverse loop and adjusting the transmission power of one said transceiver in said reverse loop based on said target set for said reverse loop such that said power target is set based on a statistical quantity other than a figure-of-merit quantity.

2. The method of claim 1, including additional reverse loops wherein said power targets for said additional reverse loops are set based on measurements of a figure-of-merit quantity.

3. The method of claim 1, wherein at least one of said statistical quantities is modified during operation of said system.

4. The method of claim 3, wherein at least one of said statistical quantities is modified based on measurement of the change in number of said transceivers communicating with said base station.

5. The method of claim 1, wherein said target for a reverse loop is set depending at least in part on a quality of service class allocation.

6. The method of claim 1, wherein said statistical quantity includes a factor based on interference from transmissions emanating other than from said cell.

7. The method of claim 1, wherein reverse loop transmitted power deviation from the power target is measured to establish at least one of said statistical quantity.

8. The method of claim 1, wherein said transceivers are active for a limited fraction of time.

9. The method of claim 1, wherein a mean, variance, or higher moment of data taken of noise emanating from outside said cell is employed in determining said statistical quantity.

10. A method for operating a wireless communication system comprising:
assigning a power target for a reverse loop, wherein said assigning step is based on one or more statistical quantities, and at least one said statistical quantity is subject to modification during operation of said system; and adjusting the transmission power of one of a plurality of wireless transceivers in a reverse loop based on the assigned target for said reverse loop such that the power target is assigned based on a statistical quantity other than a real-time frame error rate (FER), wherein said modification is based on a measurement of change in number of said transceivers communicating with said base station.

11. The method of claim 10, including additional reverse loops wherein said power targets for said additional reverse loops are assigned based on measurements of a figure-of-merit quantity.

12. The method of claim 10, wherein said target for a reverse loop is assigned depending at least in part on a quality of service class allocation.

13. The method of claim 10, wherein the at least one said statistical quantity includes a factor based on interference from transmissions emanating other than from said cell.

14. The method of claim 10, wherein reverse loop transmitted power deviation from the power target is measured to establish the at least one said statistical quantity.

15. A method for operating a wireless communication system comprising:

assigning a power target for a reverse loop, wherein said assigning step is based on one or more statistical quantities; and adjusting the transmission power of one of a plurality of wireless transceivers in a reverse loop based on the assigned target for said reverse loop such that the power target is assigned based on a statistical quantity other than a real-time frame error rate (FER), wherein a mean, variance, or higher moment of data taken of noise emanating from outside said cell is employed in determining said statistical quantity.

16. The method of claim 15, including additional reverse loops wherein said power targets for said additional reverse loops are assigned based on measurements of a figure-of-merit quantity.

17. The method of claim 15, wherein at least one said statistical quantities is subject to modification during operation of the system, and said modification is based on measurement of a change in number of said transceivers communicating with said base station.

18. The method of claim 15, wherein said target for a reverse loop is assigned depending at least in part on a quality of service class allocation.

19. The method of claim 15, wherein at least one said statistical quantity includes a factor based on interference from transmissions emanating other than from said cell.

20. The method of claim 15, wherein reverse loop transmitted power deviation from the power target is measured to establish at least one said statistical quantity.

* * * * *

UNITED STATES PATENT AND TRADEMARK OFFICE
CERTIFICATE OF CORRECTION

PATENT NO. : 7,610,058 B2
APPLICATION NO. : 11/080961
DATED : October 27, 2009
INVENTOR(S) : Morrison et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

PATENT NO.      : 7,610,058 B2                                      Page 1 of 17
APPLICATION NO. : 11/080961
DATED           : October 27, 2009
INVENTOR(S)     : Morrison et al.

It is certified that error appears in the above-identified patent and that said Letters Patent is hereby corrected as shown below:

Please add the appendix to 7,610,058 as attached.

Signed and Sealed this
Twenty-first Day of February, 2012

David J. Kappos
*Director of the United States Patent and Trademark Office*

APPENDIX

1. Introduction

The quality-of-service requirements specify the allowable fraction of packets which are undecodable at the receiver. Packets cannot be decoded when the receiver is in outage. An outage occurs when the signal-to-noise ratio falls below a predetermined threshold. Each class $i$ is characterized by requirements both when active and idle and which are in general distinct. These are the users rate, the signal-to-noise thresholds $\alpha_i/W, \beta_i/W$, and the outage probabilities $L_i, l_i$. Here $W$ is the spread bandwidth. Additionally we suppose that the probability that a user is active is $w_i$. The standard deviation of power control error may also be taken to depend on whether the user is active as well as the users data class. In what follows it will be convenient to work with the bit-energy-to-interference density ratio $E_b/I_0$ which determines the performance of the base station decoder and is usually quoted in the design of wireless communication links.. This is related to the SNR threshold via the processing gain to be $E_b/I_0 = \alpha_i/R_i$, where $R_i$ is the class $i$ active bit rate and a similar relationship when the user is idle.

To estimate the number of users we can support and determine the associated received power targets, we suppose that the system is large scale and use a central limit approximation. Put crudely, we are relying on the approximately normal behaviour of the user interference. The statistics of this interference is a combination of random activity and the user power control errors.

2. Basis

Because power control is imperfect, it is assumed that the power received at the basestation from an active mobile $m$ of class $j$ is $P_j e_m^{(j)}$, where $P_j$ is the target power, and $e_m^{(j)} = e^{\kappa_j \xi_m^{(j)}}$ where $\xi_m^{(j)}$ is normally distributed, with zero mean and unit variance. Analogously, the power received at the basestation from an idle mobile of class $j$ is $p_j \epsilon_m^{(j)}$, where $\epsilon_m^{(j)} = e^{\sigma_j \eta_m^{(j)}}$ and $\eta_m^{(j)}$ is normally distributed, with zero mean and unit variance. Additionally, let $X_m^{(j)}$ be the activity indicator for mobile $m$ of class $j$. We assume that (2.1) $\quad w_j = Pr\left\{X_m^{(j)} = 1\right\} = 1 - Pr\left\{X_m^{(j)} = 0\right\}, \; m \in \{j\}, \; j = 1,\ldots,J$.

We also assume that the random variables $(\xi_m^{(j)}, \eta_m^{(j)})$ and $X_m^{(j)}$, $m \in \{j\}$, $j = 1,\ldots,J$ are mutually independent, but we allow for possible correlation between $\xi_m^{(j)}$ and $\eta_m^{(j)}$.

The power $I^{(j)}$ received at the basestation due to all the mobiles of class $j$ is (2.2) $\quad I^{(j)} = \sum_{m \in \{j\}} \left[P_j e_m^{(j)} X_m^{(j)} + p_j \epsilon_m^{(j)}(1 - X_m^{(j)})\right]$.

The total power $I_0$ received at the basestation, including that from mobiles in other cells, is (2.3) $\quad I_0 = \sum_{l=1}^{J} I^{(l)} + \eta W + M K_0 + \sqrt{v K_0}\, S$, where $S$ is asymptotically normally distributed, with zero mean, unit variance, and error $O(1/\sqrt{K_0})$ where $K_0 \gg 1$. Here $\eta, M$ and $v$ are positive constants, and $\eta W$ is the local receiver noise power. Since we are considering a wideband system, $W$ is large.

We define (2.4) $\quad J_m^{(j)} = \sum_{m' \neq m} \left[P_j e_{m'}^{(j)} X_{m'}^{(j)} + p_j \epsilon_{m'}^{(j)}(1 - X_{m'}^{(j)})\right], \; m \in \{j\}$.

Then the interference $I_m^{(j)}$ to the transmission of any mobile of class $j$ is (2.5) $\quad I_m^{(j)} = \sum_{l \neq j} I^{(l)} + J_m^{(j)} + \eta W + M K_0 + \sqrt{v K_0}\, S$.

The SNR requirement for an active mobile is (2.6) $\quad Pr\left\{P_j e_m^{(j)} \geq \frac{\alpha_j}{W} I_m^{(j)}\right\} \geq 1 - L_j, \; m \in \{j\}, j = 1,\ldots,J$, and the SNR requirement for an idle mobile is (2.7) $\quad Pr\left\{p_j \epsilon_m^{(j)} \geq \frac{\beta_j}{W} I_m^{(j)}\right\} \geq 1 - l_j, \; m \in \{j\}, j = 1,\ldots,J$, where $L_j$ and $l_j$ are prescribed loss probabilities.

3. Asymptotic Analysis

For $m \in \{j\}$, the error terms have first and second moments (3.1) $\qquad E(e_m^{(j)}) = e^{\kappa_j^2/2}, \quad E\left[(e_m^{(j)})^2\right] = e^{2\kappa_j^2},$ and (3.2) $\qquad E(\epsilon_m^{(j)}) = e^{\sigma_j^2/2}, \quad E\left[(\epsilon_m^{(j)})^2\right] = e^{2\sigma_j^2}.$ From (2.1), since we have assumed that the activity and error random variables are mutually independent, (3.3) $E\left[P_j e_m^{(j)} X_m^{(j)} + p_j \epsilon_m^{(j)}(1 - X_m^{(j)})\right] = P_j e^{\kappa_j^2/2} w_j + p_j e^{\sigma_j^2/2}(1 - w_j),$ and (3.4) $E\left\{\left[P_j e_m^{(j)} X_m^{(j)} + p_j \epsilon_m^{(j)}(1 - X_m^{(j)})\right]^2\right\} = P_j^2 e^{2\kappa_j^2} w_j + p_j^2 e^{2\sigma_j^2}(1 - w_j).$ Hence, (3.5) $\quad v_j \equiv \mathrm{Var}\left[P_j e_m^{(j)} X_m^{(j)} + p_j \epsilon_m^{(j)}(1 - X_m^{(j)})\right]$
$\qquad = P_j^2 e^{2\kappa_j^2} w_j + p_j^2 e^{2\sigma_j^2}(1 - w_j) - \left[P_j e^{\kappa_j^2/2} w_j + p_j e^{\sigma_j^2/2}(1 - w_j)\right]^2.$ Suppose $K_j$ is the number of mobiles belonging to class $j$. From (2.2) and (2.4), since $P_j e_m^{(j)} X_m^{(j)} + p_j \epsilon_m^{(j)}(1 - X_m^{(j)})$, $m \in \{j\}$ are iid random variables with finite third moment, (3.6) $\qquad I^{(j)} = \left[P_j e^{\kappa_j^2/2} w_j + p_j e^{\sigma_j^2/2}(1 - w_j)\right] K_j + \sqrt{v_j K_j} S^{(j)},$ and (3.7) $\qquad J_m^{(j)} = \left[P_j e^{\kappa_j^2/2} w_j + p_j e^{\sigma_j^2/2}(1 - w_j)\right](K_j - 1) + \sqrt{v_j(K_j - 1)} S_m^{(j)},$ where $S^{(j)}$ and $S_m^{(j)}$ are asymptotically normally distributed with zero mean, unit variance and error $O(1/\sqrt{K_j})$ as $K_j \to \infty$, see W. Feller, *An Introduction to Probability Theory and Its Applications*, Vol. II, John Wiley, New York, 1971, p. 539. This is an estimate for convergence in distribution, but it is shown in Addendum A that the densities converge as well. The random variables $S^{(l)}$, $l \neq j$ and $S_m^{(j)}$ are mutually independent. We now take the following asymptotic scalings, (3.8) $$\eta W = N_0 K, \quad K_j = \gamma_j K, \quad j = 0, \ldots, J,$$

where $N_0 = O(1)$ and $\gamma_j = O(1)$ as $K, W \to \infty$. We take $K = \min_j K_j$. If we introduce these scalings into the expression (2.5) for $I_m^{(j)}$, and use (3.6) and (3.7), and let (3.9) $$N = N_0 + M\gamma_0, \quad V = v\gamma_0$$

we obtain (3.10) $$\frac{I_m^{(j)}}{K} = \sum_{l=1}^{J} \left[ P_l e^{\kappa_l^2/2} w_l + p_l e^{\sigma_l^2/2}(1 - w_l) \right] \gamma_l + N + \sqrt{\frac{V}{K}} S$$
$$+ \frac{1}{\sqrt{K}} \left[ \sum_{l \neq j} \sqrt{v_l \gamma_l} S^{(l)} + \sqrt{v_j \left(\gamma_j - \frac{1}{K}\right)} S_m^{(j)} \right]$$
$$- \frac{1}{K} \left[ P_j e^{\kappa_j^2/2} w_j + p_j e^{\sigma_j^2/2}(1 - w_j) \right].$$

We define (3.11) $$G = \sum_{l=1}^{J} \left[ P_l e^{\kappa_l^2/2} w_l + p_l e^{\sigma_l^2/2}(1 - w_l) \right] \gamma_l + N,$$

(3.12) $$\lambda_j = \frac{P_j}{G}, \quad \theta_j = \frac{p_j}{G}, \quad \Phi = \frac{V}{G^2},$$

(3.13) $$\Gamma_j = \lambda_j e^{\kappa_j^2/2} w_j + \theta_j e^{\sigma_j^2/2}(1 - w_j),$$
$$\Phi_l = \lambda_l^2 e^{2\kappa_l^2} w_l + \theta_l^2 e^{2\sigma_l^2}(1 - w_l) - \Gamma_l^2,$$

and (3.14) $$\Lambda_m^{(j)} = \sum_{l \neq j} \sqrt{\Phi_l \gamma_l} S^{(l)} + \sqrt{\Phi_j \left(\gamma_j - \frac{1}{K}\right)} S_m^{(j)} + \sqrt{\Phi} S.$$

We also introduce the scalings (3.15) $$\frac{\alpha_j}{W} = \frac{a_j}{K}, \quad \frac{\beta_j}{W} = \frac{b_j}{K}, \quad j = 1, \ldots, J$$

where $a_j = O(1)$ and $b_j = O(1)$ as $K, W \to \infty$. Then, from (3.5) and (3.10)-(3.15), the inequalities $P_j e_m^{(j)} \geq (\alpha_j/W) I_m^{(j)}$ and $p_j \epsilon_m^{(j)} \geq (\beta_j/W) I_m^{(j)}$ imply that, for $j = 1, \ldots, J$, (3.16) $\quad \dfrac{\lambda_j}{a_j} e^{\kappa_j \xi_m^{(j)}} \geq 1 + \dfrac{\Lambda_m^{(j)}}{\sqrt{K}} - \dfrac{\Gamma_j}{K}, \quad \dfrac{\theta_j}{b_j} e^{\sigma_j \eta_m^{(j)}} \geq 1 + \dfrac{\Lambda_m^{(j)}}{\sqrt{K}} - \dfrac{\Gamma_j}{K}.$

4. Capacity and Minimal Powers

We assume that $\kappa_j \geq \kappa > 0$ and $\sigma_j \geq \sigma > 0$, $j = 1, \ldots, J$ and that $\kappa$ and $\sigma$ are not small. We define (4.1) $\quad Y_m^{(j)} = \dfrac{\lambda_j}{a_j} e^{\kappa_j \xi_m^{(j)}} - \dfrac{\Lambda_m^{(j)}}{\sqrt{K}}, \quad U_m^{(j)} = \dfrac{\theta_j}{b_j} e^{\sigma_j \eta_m^{(j)}} - \dfrac{\Lambda_m^{(j)}}{\sqrt{K}}.$ It is shown in Addendum B that the densities of $(\lambda_j/a_j)e^{\kappa_j \xi_m^{(j)}}$ and $(\theta_j/b_j)e^{\sigma_j \eta_m^{(j)}}$ are, respectively, (4.2) $\quad g_j(y) = \dfrac{1}{\sqrt{2\pi}\kappa_j y} \exp\left\{ -\dfrac{1}{2}\left[\dfrac{1}{\kappa_j}\ln\left(\dfrac{a_j y}{\lambda_j}\right)\right]^2 \right\}, \quad y > 0,$ and (4.3) $\quad h_j(y) = \dfrac{1}{\sqrt{2\pi}\sigma_j y} \exp\left\{ -\dfrac{1}{2}\left[\dfrac{1}{\sigma_j}\ln\left(\dfrac{b_j y}{\theta_j}\right)\right]^2 \right\}, \quad y > 0.$ Moreover, it is shown that $Y_m^{(j)}$ and $U_m^{(j)}$ have densities (4.4) $\quad g_j(y) + \dfrac{1}{2K}\left(\sum_{l=1}^{J} \Phi_l \gamma_l + \Phi\right)\dfrac{d^2 g_j}{dy^2} + O\left(\dfrac{1}{K^2}\right), \quad y > 0$ and (4.5) $\quad h_j(y) + \dfrac{1}{2K}\left(\sum_{l=1}^{J} \Phi_l \gamma_l + \Phi\right)\dfrac{d^2 h_j}{dy^2} + O\left(\dfrac{1}{K^2}\right), \quad y > 0,$ respectively.

We define the outage quantiles $\nu_j$ and $\rho_j$ by (4.6) $\quad 1 - L_j = \dfrac{1}{\sqrt{2\pi}} \int_{-\nu_j}^{\infty} e^{-z^2/2} dz = \int_{\frac{\lambda_j}{a_j} e^{-\kappa_j \nu_j}}^{\infty} g_j(y) dy,$ and
$$(4.7) \quad 1 - l_j = \frac{1}{\sqrt{2\pi}} \int_{-\rho_j}^{\infty} e^{-z^2/2} dz = \int_{\frac{\theta_j}{b_j} e^{-\sigma_j \rho_j}}^{\infty} h_j(y) dy.$$

From (2.6), (2.7), (3.16) and (4.1), the quality of service requirements are $$(4.8) \quad Pr\left\{Y_m^{(j)} \geq 1 - \frac{\Gamma_j}{K}\right\} \geq \int_{\frac{\lambda_j}{a_j} e^{-\kappa_j \rho_j}}^{\infty} g_j(y) dy,$$

and
$$(4.9) \quad Pr\left\{U_m^{(j)} \geq 1 - \frac{\Gamma_j}{K}\right\} \geq \int_{\frac{\theta_j}{b_j} e^{-\sigma_j \rho_j}}^{\infty} h_j(y) dy.$$

Hence, from (4.4) and (4.5), $$(4.10) \quad \int_{\frac{\lambda_j}{a_j} e^{-\kappa_j \rho_j}}^{\infty} g_j(y) dy$$
$$\leq \int_{1-\frac{r_j}{K}}^{\infty} g_j(y) dy - \frac{1}{2K} \left(\sum_{l=1}^{J} \Phi_l \gamma_l + \Phi\right) \frac{dg_j}{dy}(1) + O\left(\frac{1}{K^2}\right),$$

and
$$(4.11) \quad \int_{\frac{\theta_j}{b_j} e^{-\sigma_j \rho_j}}^{\infty} h_j(y) dy$$
$$\leq \int_{1-\frac{r_j}{K}}^{\infty} h_j(y) dy - \frac{1}{2K} \left(\sum_{l=1}^{J} \Phi_l \gamma_l + \Phi\right) \frac{dh_j}{dy}(1) + O\left(\frac{1}{K^2}\right).$$

But, from (4.2) and (4.3), $$(4.12) \quad \frac{dg_j}{dy}(1) = -\left[1 + \frac{1}{\kappa_j^2} \ln\left(\frac{a_j}{\lambda_j}\right)\right] g_j(1),$$

$$\frac{dh_j}{dy}(1) = -\left[1 + \frac{1}{\sigma_j^2} \ln\left(\frac{b_j}{\theta_j}\right)\right] h_j(1).$$

Also
$$(4.13) \quad \int_{1-\frac{(\xi+\mu)}{K}}^{\infty} g_j(y) dy = \int_{1-\frac{\xi}{K}}^{\infty} g_j(y) dy + \frac{\xi}{K} g_j(1) + O\left(\frac{1}{K^2}\right),$$

and
$$(4.14) \quad \int_{1-\frac{(\xi+\mu)}{K}}^{\infty} h_j(y) dy = \int_{1-\frac{\xi}{K}}^{\infty} h_j(y) dy + \frac{\mu}{K} h_j(1) + O\left(\frac{1}{K^2}\right).$$

It follows from (4.10)–(4.14) that, for $j = 1, \ldots, J$, $$(4.15) \quad \frac{\lambda_j}{a_j} e^{-\kappa_j \nu_j} \geq 1 - \frac{\Gamma_j}{K} - \frac{1}{2K} \left( \sum_{l=1}^{J} \Phi_l \gamma_l + \Phi \right) \left[ 1 + \frac{1}{\kappa_j^2} \ln\left(\frac{a_j}{\lambda_j}\right) \right] + O\left(\frac{1}{K^2}\right),$$

and $$(4.16) \quad \frac{\theta_j}{b_j} e^{-\sigma_j \rho_j} \geq 1 - \frac{\Gamma_j}{K} - \frac{1}{2K} \left( \sum_{l=1}^{J} \Phi_l \gamma_l + \Phi \right) \left[ 1 + \frac{1}{\sigma_j^2} \ln\left(\frac{b_j}{\theta_j}\right) \right] + O\left(\frac{1}{K^2}\right).$$

To lowest order, $$(4.17) \quad \lambda_j \geq a_j e^{\kappa_j \nu_j} \left[ 1 + O\left(\frac{1}{K}\right) \right], \quad \theta_j \geq b_j e^{\sigma_j \rho_j} \left[ 1 + O\left(\frac{1}{K}\right) \right].$$

Hence, from (3.12), $$(4.18) \quad P_j \geq a_j e^{\kappa_j \nu_j} G \left[ 1 + O\left(\frac{1}{K}\right) \right], \quad p_j \geq b_j e^{\sigma_j \rho_j} G \left[ 1 + O\left(\frac{1}{K}\right) \right].$$

We define $$(4.19) \quad \tau = \sum_{j=1}^{J} \left[ a_j e^{\kappa_j \nu_j} e^{\kappa_j^2/2} w_j + b_j e^{\sigma_j \rho_j} e^{\rho_j^2/2} (1 - w_j) \right] \gamma_j.$$

Then, from (3.11) and (4.18), we obtain $$(4.20) \quad \left[ 1 - \tau + O\left(\frac{1}{K}\right) \right] G \geq N.$$

We assume that the target powers are limited, $P_j \leq \overline{P}_j$ and $p_j \leq \overline{p}_j$, $j = 1, \ldots, J$, and we define $$(4.21) \quad \Delta_0 = \max_j \max \left( \frac{a_j}{\overline{P}_j} e^{\kappa_j \nu_j}, \frac{b_j}{\overline{p}_j} e^{\sigma_j \rho_j} \right),$$

and assume that $N \Delta_0 < 1$. It follows from (4.18) that $$(4.22) \quad \frac{1}{G} \geq \Delta_0 \left[ 1 + O\left(\frac{1}{K}\right) \right],$$

and (4.20) implies that $$(4.23) \qquad \tau \leq 1 - N\Delta_0 + O\left(\frac{1}{K}\right),$$

which is the lowest order approximation to the admissible set. Also, from (4.18) and (4.20), the minimal powers are $$(4.24) \qquad P_j^* = \frac{Na_j e^{\kappa_j \nu_j}\left[1 + O\left(\frac{1}{K}\right)\right]}{[1 - \tau + O\left(\frac{1}{K}\right)]}, \quad p_j^* = \frac{Nb_j e^{\sigma_j \rho_j}\left[1 + O\left(\frac{1}{K}\right)\right]}{[1 - \tau + O\left(\frac{1}{K}\right)]}.$$

We investigate the first order correction terms in the next section.

5. Refined Approach

The minimal powers $P_j^*$ and $p_j^*$ correspond to equality in (4.18) and (4.20) and hence, from (3.12), $$(5.1) \qquad \lambda_j = a_j e^{\kappa_j \nu_j}\left(1 + \frac{n_j}{K}\right), \quad \theta_j = b_j e^{\sigma_j \rho_j}\left(1 + \frac{q_j}{K}\right),$$

where $n_j = O(1)$ and $q_j = O(1)$, and $$(5.2) \qquad \frac{1}{G} = \frac{(1-\tau)}{N} + O\left(\frac{1}{K}\right).$$

Then, from (3.12), (3.13), (5.1) and (5.2), $$(5.3) \quad \Gamma_j = \Theta_j + O(1/K), \quad \Phi_l = \Psi_l + O(1/K), \quad \Phi = \Psi + O(1/K),$$

where $$(5.4) \qquad \Theta_j = a_j e^{\kappa_j \nu_j} e^{\kappa_j^2/2} w_j + b_j e^{\sigma_j \rho_j} e^{\sigma_j^2/2}(1 - w_j),$$

and $$(5.5) \quad \Psi_l = a_l^2 e^{2\kappa_l \nu_l} e^{2\kappa_l^2} w_l + b_l^2 e^{2\sigma_l \rho_l} e^{2\sigma_l^2}(1 - w_l) - \Theta_l^2, \quad \Psi = V\left(\frac{1-\tau}{N}\right)^2$$

Also, (4.15) and (4.16) imply that $$(5.6) \qquad n_j \geq \Omega_j + O\left(\frac{1}{K}\right), \quad q_j \geq Z_j + O\left(\frac{1}{K}\right),$$

where $$(5.7) \quad \Omega_j = \frac{1}{2}\left(\frac{\nu_j}{\kappa_j} - 1\right)\left(\sum_{l=1}^{J} \Psi_l \gamma_l + \Psi\right) - \Theta_j,$$

$$Z_j = \frac{1}{2}\left(\frac{\rho_j}{\sigma_j} - 1\right)\left(\sum_{l=1}^{J} \Psi_l \gamma_l + \Psi\right) - \Theta_j.$$

We define $$(5.8) \quad \chi = \sum_{j=1}^{J}[a_j e^{\kappa_j \nu_j} e^{\kappa_j^2/2} w_j \Omega_j + b_j e^{\sigma_j \rho_j} e^{\sigma_j^2/2}(1-w_j) Z_j]\gamma_j.$$

Then, from (3.11), (3.12), (5.1) and (5.6), we obtain $$(5.9) \quad \left[1 - \tau - \frac{\chi}{K} + O\left(\frac{1}{K^2}\right)\right] G \geq N.$$

The minimal powers, corresponding to equality in (5.6) and (5.9), are $$(5.10) \quad P_j^* = \frac{N a_j e^{\kappa_j \nu_j}\left[1 + \frac{\Omega_j}{K} + O\left(\frac{1}{K^2}\right)\right]}{\left[1 - \tau - \frac{\chi}{K} + O\left(\frac{1}{K^2}\right)\right]}$$

and $$(5.11) \quad P_j^* = \frac{N b_j e^{\sigma_j \rho_j}\left[1 + \frac{Z_j}{K} + O\left(\frac{1}{K^2}\right)\right]}{\left[1 - \tau - \frac{\chi}{K} + O\left(\frac{1}{K^2}\right)\right]}.$$

But, $P_j^* \leq \bar{P}_j$ and $p_j^* \leq \bar{p}_j$, $j = 1, \ldots, J$. We define $$(5.12) \quad \Delta = \max_j \max\left[\frac{a_j}{\bar{P}_j} e^{\kappa_j \nu_j}\left(1 + \frac{\Omega_j}{K}\right), \frac{b_j}{\bar{p}_j} e^{\sigma_j \rho_j}\left(1 + \frac{Z_j}{K}\right)\right],$$

and assume that $N\Delta < 1$. Then the refined approximation to the admissible set is $$(5.13) \quad \tau + \frac{\chi}{K} = 1 - N\Delta + O\left(\frac{1}{K^2}\right).$$

We now express the results in terms of the original variables, and define $$(5.14) \quad f_j = \frac{W}{K}\Theta_j, \quad \psi_j = \left(\frac{W}{K}\right)^2 \Psi_j, \quad \omega_j = \frac{W}{K}\Omega_j, \quad \zeta_j = \frac{W}{K}Z_j, \quad \psi = \frac{W^2}{K}\Psi$$

and $$(5.15) \quad \delta_0 = \frac{W}{K}\Delta_0, \quad \delta = \frac{W}{K}\Delta, \quad X = \frac{W}{K}\chi.$$

Then, from (3.8), (3.9), (3.15), (5.4), (5.5) and (5.7), $$(5.16) \quad f_j = \alpha_j e^{\kappa_j \nu_j} e^{\kappa_j^2/2} w_j + \beta_j e^{\sigma_j \rho_j} e^{\sigma_j^2/2}(1 - w_j),$$

$$(5.17) \quad \psi_l = \alpha_l^2 e^{2\kappa_l \nu_l} e^{2\kappa_l^2} w_l + \beta_l^2 e^{2\sigma_l \rho_l} e^{2\sigma_l^2}(1 - w_l) - f_l^2,$$

$$(5.18) \quad \psi = v K_0 \left[\frac{W(1-\tau)}{(\eta W + M K_0)}\right]^2,$$

and $$(5.19) \quad \omega_j = \frac{1}{2W}\left(\frac{\nu_j}{\kappa_j} - 1\right)\left(\sum_{l=1}^{J}\psi_l K_l + \psi\right) - f_j,$$

$$\zeta_j = \frac{1}{2W}\left(\frac{\rho_j}{\sigma_j} - 1\right)\left(\sum_{l=1}^{J}\psi_l K_l + \psi\right) - f_j.$$

Also, from (3.8), (3.15), (4.19) and (5.8)

$$(5.20) \quad \tau = \frac{1}{W}\sum_{j=1}^{J}[\alpha_j e^{\kappa_j \nu_j} e^{\kappa_j^2/2} w_j + \beta_j e^{\sigma_j \rho_j} e^{\sigma_j^2/2}(1 - w_j)]K_j$$

and $$(5.21) \quad X = \frac{1}{W}\sum_{j=1}^{J}[\alpha_j e^{\kappa_j \nu_j} e^{\kappa_j^2/2} w_j \omega_j + \beta_j e^{\sigma_j \rho_j} e^{\sigma_j^2/2}(1 - w_j)\zeta_j]K_j.$$

Finally, from (3.15), (4.21) and (5.12), $$(5.22) \quad \delta_0 = \max_j \max\left(\frac{\alpha_j}{\bar{P}_j}e^{\kappa_j \nu_j}, \frac{\beta_j}{\bar{p}_j}e^{\sigma_j \rho_j}\right)$$

and $$(5.23) \quad \delta = \max_j \max\left[\frac{\alpha_j}{\bar{P}_j}e^{\kappa_j \nu_j}\left(1 + \frac{\omega_j}{W}\right), \frac{\beta_j}{\bar{p}_j}e^{\sigma_j \rho_j}\left(1 + \frac{\zeta_j}{W}\right)\right].$$

To lowest order, from (4.23) and (4.24), the admissible set is given by $$(5.24) \quad \tau \leq 1 - \left(\eta + \frac{M K_0}{W}\right)\delta_0.$$

and the minimal powers by $$(5.25) \quad P_j^* = \frac{\alpha_j e^{\kappa_j \nu_j}}{(1-\tau)} \left( \eta + \frac{MK_0}{W} \right), \quad p_j^* = \frac{\beta_j e^{\sigma_j \rho_j}}{(1-\tau)} \left( \eta + \frac{MK_0}{W} \right).$$

In the refined approximation, from (5.10), (5.11) and (5.13)

$$(5.26) \quad \tau + \frac{X}{W} \leq 1 - \left( \eta + \frac{MK_0}{W} \right) \delta,$$

and $$(5.27) \quad P_j^* = \frac{\alpha_j e^{\kappa_j \nu_j} \left( \eta + \frac{MK_0}{W} \right) \left( 1 + \frac{\omega_j}{W} \right)}{\left( 1 - \tau - \frac{X}{W} \right)},$$

$$p_j^* = \frac{\beta_j e^{\sigma_j \rho_j} \left( \eta + \frac{MK_0}{W} \right) \left( 1 + \frac{\varsigma_j}{W} \right)}{\left( 1 - \tau - \frac{X}{W} \right)}.$$

Addendum A

A. Uniform Convergence to Gaussian Density

We here establish (3.6), where $S^{(j)}$ is asymptotically normally distributed with zero mean, unit variance and error $O(1/\sqrt{K_j})$ as $K_j \to \infty$. We define $$(A.1) \qquad \phi(\kappa; T) = \frac{1}{\sqrt{2\pi}} \int_{-\infty}^{\infty} e^{iTe^{\kappa\xi}} e^{-\xi^2/2} d\xi.$$

Then, from (2.1), since $e_m^{(j)} = e^{\kappa_j \xi_m^{(j)}}$ and $\epsilon_m^{(j)} = e^{\sigma_j \eta_m^{(j)}}$, where $\xi_m^{(j)}$ and $\eta_m^{(j)}$ are normally distributed, with zero mean and unit variance, and $(\xi_m^{(j)}, \eta_m^{(m)})$ and $X_m^{(j)}$ are mutually independent, $$(A.2) \qquad u_j(t) = E\left(\exp\left\{it[P_j e_m^{(j)} X_m^{(j)} + p_j \epsilon_m^{(j)}(1 - X_m^{(j)})]\right\}\right)$$
$$= w_j \phi(\kappa_j; P_j t) + (1 - w_j)\phi(\sigma_j; p_j t).$$

We first show that $\phi(\kappa; T)$, where $\kappa > 0$, is absolutely integrable for $-\infty < T < \infty$. From (A.1), we have $|\phi(\kappa; T)| \leq 1$. If we integrate twice by parts for $T \neq 0$, we obtain $$\phi(\kappa; T) = -\frac{i}{\sqrt{2\pi}\kappa T} \int_{-\infty}^{\infty} e^{iTe^{\kappa\xi}} (\kappa + \xi) e^{-\kappa\xi} e^{-\xi^2/2} d\xi$$
$$(A.3) \qquad = \frac{1}{\sqrt{2\pi}(\kappa T)^2} \int_{-\infty}^{\infty} e^{iTe^{\kappa\xi}} [1 - (\kappa + \xi)(2\kappa + \xi)] e^{-2\kappa\xi} e^{-\xi^2/2} d\xi.$$

Hence, $$(A.4) \qquad |\phi(\kappa; T)|$$
$$\leq \frac{1}{\sqrt{2\pi}(\kappa T)^2} \int_{-\infty}^{\infty} |[1 - (\kappa + \xi)(2\kappa + \xi)]| e^{-2\kappa\xi} e^{-\xi^2/2} d\xi \equiv \frac{C(\kappa)}{T^2},$$

which shows that $\phi(\kappa; T)$ is absolutely integrable. We assume that $\kappa_j > 0$ and $\sigma_j > 0$, and that $P_j > 0$, $p_j \geq 0$ and $0 < w_j \leq 1$. If $p_j > 0$ or $w_j = 1$, then $u_j(t)$ is absolutely integrable, and (3.6) follows from (1.5.9) of J. L. Jensen, *Saddlepoint Approximations*, Clarendon Press, Oxford, 1995.

If $p_j = 0$ and $0 < w_j < 1$, then we must modify the estimate (1.5.9) in Jensen supra, since $|u_j(t)|^\nu$ is not absolutely integrable for any $\nu \geq 1$ in this case. We now adopt his notation and, dropping the subscripts and superscripts, and rescaling $t$, we define (A.5) $$\gamma(t) = w\phi(\kappa;t) + 1 - w.$$

To establish our result, we need to estimate (A.6) $$R = \left(\int_{\sqrt{n}c_3}^{\sqrt{n}r} + \int_{-\sqrt{n}r}^{-\sqrt{n}c_3}\right) \left[\gamma\left(\frac{t}{\sqrt{n}}\right)\right]^n e^{-i\mu_1\sqrt{n}t} e^{-iyt} dt$$

as $n \to \infty$, for real $y = O(1)$ and $r > c_3 > 0$. Here the mean $\mu_1 = we^{\kappa^2/2} > 0$.

Now, for $|x| < \delta$, (A.7) $$|(1+x)^n - 1| = \left|x\sum_{s=1}^{n}\binom{n}{s}x^{s-1}\right|$$

$$\leq \frac{|x|}{\delta}|(1+\delta)^n - 1| \leq \frac{|x|}{\delta}(1+\delta)^n.$$

But, $|\phi(\kappa;T)| \leq \epsilon < 1$ for $|T| \geq c_3$. It follows that (A.8) $$|[\gamma(T)]^n - (1-w)^n| \leq \frac{1}{\epsilon}|\phi(\kappa;T)|(1 - w + \epsilon w)^n, \quad |T| \geq c_3.$$

Hence, (A.9) $$\left|\int_{|t|\geq\sqrt{n}c_3}\left\{\left[\gamma\left(\frac{t}{\sqrt{n}}\right)\right]^n - (1-w)^n\right\}e^{-i\mu_1\sqrt{n}t}e^{-iyt}dt\right|$$

$$\leq \frac{\sqrt{n}}{\epsilon}(1 - w + \epsilon w)^n \int_{|T|\geq c_3}|\phi(\kappa;T)|dT \to 0$$

as $n \to \infty$, since $0 < 1 - w + \epsilon w < 1$.

Next, for $y = O(1)$ and $\mu_1\sqrt{n} + y > 0$, (A.10) $$\left|\left(\int_{\sqrt{n}c_3}^{\sqrt{n}r} + \int_{-\sqrt{n}r}^{-\sqrt{n}c_3}\right) e^{-i\mu_1\sqrt{n}t}e^{-iyt}dt\right|$$

$$\leq \left|\frac{i}{(\mu_1\sqrt{n}+y)}\left\{[e^{-i\mu_1\sqrt{n}t}e^{-iyt}]_{\sqrt{n}c_3}^{\sqrt{n}r} + [e^{-i\mu_1\sqrt{n}t}e^{-iyt}]_{-\sqrt{n}r}^{-\sqrt{n}c_3}\right\}\right|$$

$$\leq \frac{4}{(\mu_1\sqrt{n}+y)}.$$

This holds for all $r > c_3$. Hence, from (A.6), (A.9) and (A.10), we obtain (A.11) $\quad |R| \leq \dfrac{\sqrt{n}}{\epsilon}(1 - w + \epsilon w)^n \displaystyle\int_{|T| \geq c_3} |\phi(\kappa; T)| dT + \dfrac{4(1-w)^n}{(\mu_1 \sqrt{n} + y)}$.

With this modification of the estimate in (1.5.9) in Jensen supra, the result in (3.6) follows.

Addendum B

B. Density Calculations

We here determine the densities of the random variables $Y_m^{(j)}$ and $U_m^{(j)}$ defined in (4.1), where $\Lambda_m^{(j)}$ is given by (3.14). Since $\xi_m^{(j)}$ and $\eta_m^{(j)}$ are normally distributed, with zero mean and unit variance, the characteristic functions of $(\lambda_j/a_j)e^{\kappa_j \xi_m^{(j)}}$ and $(\theta_j/b_j)e^{\sigma_j \eta_m^{(j)}}$ are $$(B.1) \qquad \frac{1}{\sqrt{2\pi}} \int_{-\infty}^{\infty} e^{it(\lambda_j/a_j)e^{\kappa_j \zeta}} e^{-\zeta^2/2} d\zeta = \int_{0}^{\infty} e^{ity} g_j(y) dy$$

and $$(B.2) \qquad \frac{1}{\sqrt{2\pi}} \int_{-\infty}^{\infty} e^{it(\theta_j/b_j)e^{\sigma_j \zeta}} e^{-\zeta^2/2} d\zeta = \int_{0}^{\infty} e^{ity} h_j(y) dy,$$

where the densities are given by (4.2) and (4.3).

The random variables $S^{(l)}$ and $S_m^{(j)}$ are asymptotically normally distributed with zero mean and unit variance, and densities. Since $K_l = O(K)$, $l = 1, \ldots, J$, it follows from (1.5.3) of Jensen supra that, for $t = O(1)$, $$(B.3) \qquad E\left(e^{it\sqrt{\Phi_l \gamma_l} S^{(l)}/\sqrt{K}}\right) = e^{-\Phi_l \gamma_l t^2/(2K)} \left[1 + O\left(\frac{1}{K^2}\right)\right],$$

$$E\left(e^{it\sqrt{\Phi_j(\gamma_j - \frac{1}{K})} S_m^{(j)}/\sqrt{K}}\right) = e^{-\Phi_j \gamma_j t^2/(2K)} \left[1 + O\left(\frac{1}{K^2}\right)\right],$$

and, assuming that $S$ has a density, $$(B.4) \qquad E\left(e^{it\sqrt{\Phi} S/\sqrt{K}}\right) = e^{-\Phi t^2/(2K)} \left[1 + O\left(\frac{1}{K^2}\right)\right].$$

Hence, from (3.14), since $S$, $S^{(l)}$, $l \neq j$ and $S_m^{(j)}$ are mutually independent, $$(B.5) E(e^{it\Lambda_m^{(j)}/\sqrt{K}}) = \exp\left(-\frac{1}{2K}\left[\sum_{l=1}^{J} \Phi_l \gamma_l + \Phi\right] t^2\right) \left[1 + O\left(\frac{1}{K^2}\right)\right]$$

$$= 1 - \frac{1}{2K}\left[\sum_{l=1}^{J} \Phi_l \gamma_l + \Phi\right] t^2 + O\left(\frac{1}{K^2}\right).$$

Since the random variables $(\xi_m^{(j)}, \eta_m^{(j)})$ and $\Lambda_m^{(j)}$ are independent, it follows from (4.1), (B.1), (B.2) and (B.5) that the characteristic functions of $Y_m^{(j)}$ and $U_m^{(j)}$ are $$(B.6) \quad \left[1 - \frac{1}{2K}\left(\sum_{l=1}^{J}\Phi_l\gamma_l + \Phi\right)t^2 + O\left(\frac{1}{K^2}\right)\right]\int_0^\infty e^{ity}g_j(y)dy$$

and $$(B.7) \quad \left[1 - \frac{1}{2K}\left(\sum_{l=1}^{J}\Phi_l\gamma_l + \Phi\right)t^2 + O\left(\frac{1}{K^2}\right)\right]\int_0^\infty e^{ity}h_j(y)dy,$$

and hence the densities are given by (4.4) and (4.5), respectively.